Patented Nov. 9, 1943

2,333,771

UNITED STATES PATENT OFFICE 2,333,771

4(1)-HALO-1(4)-ACYLOXYVALERIC ACID AND DERIVATIVES AND PREPARATION THEREOF

Joseph B. Dickey and Robert A. Corbitt, Rochester, N. Y., assignors to Eastman Kodak Company, Rochester, N. Y., a corporation of New Jersey No Drawing. Application September 7, 1940, Serial No. 355,875

9 Claims. (Cl. 260—484)

This invention relates to valeric acid compounds and to a process for the preparation thereof. More particularly, it relates to compounds characterized by one of the following formulas:

$$X-CH_2-CH_2-CH_2-CH(OZ)-COOR$$

and $$ZO-CH_2-CH_2-CH_2-CH(X)-COOR$$

wherein R represents hydrogen, an alkyl group such as methyl, ethyl, propyl, butyl, cetyl, methoxymethyl, methoxyethyl, ethoxybutyl or an alkali-forming metal such as sodium, potassium, calcium and the like, X represents a halogen atom and Z represents hydrogen or an acyl group such as acetyl, propionyl, butyryl, valeryl, stearyl, benzoyl, naphthoyl and other similar kind of groups. Further, the nuclei of the benzoyl and naphthoyl groups can be substituted by one or more monovalent substituents from the group including chlorine, bromine, methyl, ethyl, butyl, methoxy, ethoxy, butoxy, sulfondimethylamide or the like groups.

We have found that our new 4(1)halo-1(4)-acyloxyvaleric acids and derivatives above described are valuable plasticisers and softening agents for organic derivatives of cellulose such as cellulose nitrate, cellulose formate, cellulose acetate, cellulose propionate, cellulose butyrate, cellulose phthalate, cellulose acetate-propionate, cellulose acetate-butyrate, methyl cellulose, ethyl cellulose, benzyl cellulose and the like, vinyl resins including vinyl alkyl ketone resins, and vinyl acetal resins, phenol aldehyde resins, indene resins, and other similar kind of synthetic resinous materials. In addition to their plasticizing properties, our new compounds are also valuable intermediates for the preparation of amino acids. Further, by reacting our compounds with aniline or α-naphthylamine and their derivatives, compounds can be obtained which are valuable as couplers in the preparation of dyes such as azo, indophenol and anthraquinone, as well as coupling components in various photographic color processes.

Accordingly, it is among the objects of our invention to provide new valeric acid compounds. A further object is to provide a process for the preparation of these compounds.

The compounds of our invention are prepared from tetrahydrofuroic acid and its derivatives, the method involving the simultaneous breakage of the furyl ring and the coupling of the open chain products so formed with an acyl halide in the presence of a metallic halide catalyst. The products obtained by distillation of the reaction mixture consists of a greater portion of the 4-halo-1-acyloxyvaleric acid compound and a lesser portion of the 1-halo-4-acyloxyvaleric acid compound. As acyl halides there can be employed the acid chlorides, acid bromides, acid fluorides or acid iodides of aliphatic and aromatic acids such as acetic, propionic, butyric, valeric, stearic, benzoic and naphthoic acids. The catalyst can be the chloride, bromide, fluoride or iodide of zinc, or, the corresponding halide of titanium or boron, as well as a halide of zirconium, aluminum, iron, beryllium, nickel, tin or molybdenum. When the 4(1)-halo-1(4)-acyloxyvaleric acid compounds above described are hydrolyzed with an excess of aqueous caustic soda solution, there is obtained 1,4-dihydroxyvaleric acid. If the hydrolyzing agent is a mineral acid instead of caustic soda, the compound obtained is a 4(1)-halo-1(4)-hydroxyvaleric acid.

The invention is illustrated further by the following examples describing the preparation of a number of our new compounds.

Example 1

A mixture of 1 mole of ethyltetrahydrofuroate, 1.1 moles of acetyl chloride, and 0.5 gram of zinc chloride was heated under reflux on a steam bath for about one hour, and then distilled under reduced pressure. There was obtained a good yield of 4-chloro-1-acetoxy-ethylvalerate, and a smaller yield of the isomeric 1-chloro-4-acetoxyethylvalerate.

Example 2

A mixture of 1 mole of methyltetrahydrofuroate, 1.1 moles of acetyl bromide, and 0.5 gram of zinc bromide was heated on a steam bath for a period of about 1.5 hours, and then distilled. A good yield of 4-bromo-1-acetoxy-methylvalerate was obtained, the main portion having a boiling range of 130–135° C. at 10 mm. pressure. By subjecting the above compound to an acid hydrolysis with hydrochloric acid, 4-bromo-1-hydroxyvaleric acid was obtained as a product.

Example 3

1 mole of propyltetrahydrofuroate was heated on a steam bath with 1.1 moles of propionyl fluoride and a small quantity of zinc chloride as a catalyst. When the reaction was complete, the mixture was distilled and the product 4-fluoro-1-propionoxy- propylvalerate obtained in good yield, the main portion having a boiling range of 140–145° C. at 13 mm. pressure.

Example 4

1 mole of tetrahydrofuroic acid was heated with 0.5 gram of zinc chloride on a steam bath and then 1 mole of acetyl chloride added slowly with stirring. A good yield of 4-chloro-1-acetoxyvaleric acid was obtained by distilling the reaction mixture.

Example 5

1 mole of 4-chloro-1-benzoyloxy-phenylvalerate was boiled with 4 mole equivalents of aqueous 10% sodium hydroxide. When the halogen had all been removed, the reaction mixture was cooled, and made slightly acid to Congo red with hydrochloric acid. The 1,4-dihydroxyvaleric acid formed by this reaction was recovered by extraction with ethyl ether. The purified product was a colorless, viscous liquid which formed a lactone on heating.

Example 6

A mixture of 1 mole of 3-methyltetrahydrofuroic acid ethyl ester, 1 mole of benzoyl iodide and 0.5 gram of zinc chloride was heated on a steam bath. The product 4-iodo-1-benzoyloxy-ethylvalerate was purified by crystallization.

Example 7

1 mole of ethyltetrahydrofuroate was reacted with 1.1 moles of ethylchlorocarbonate following the procedure of Example 1. The resulting product 4-chloro-1-ethoxycarboxy-ethylvalerate was purified by crystallization.

We claim:

1. A valeric acid compound having the general formula:

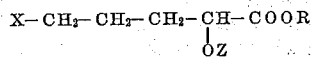

wherein R represents a member selected from the group consisting of hydrogen, an alkyl group, and an alkali-forming metal, X represents a halogen, and Z represents an acyl group.

2. A valeric acid compound having the general formula:

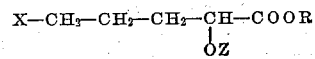

wherein R represents a member selected from the group consisting of hydrogen, an alkyl group, and an alkali-forming metal, X represents a halogen, and Z represents an acetyl group.

3. A valeric acid compound having the general formula:

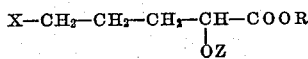

wherein R represents a member selected from the group consisting of hydrogen, an alkyl group, and an alkali-forming metal, X represents a halogen, and Z represents a benzoyl group.

4. A process for preparing a 4-halo-1-acyloxy-valeric acid comprising reacting an acyl halide with a tetrahydrofuroic acid in the presence of a metallic halide catalyst.

5. A process for preparing 4-halo-1-acyloxy-valeric ester comprising reacting an acyl halide with a tetrahydrofuroic acid alkyl ester in the presence of a metallic halide catalyst.

6. A process for preparing a 4-halo-1-hydroxy-valeric acid comprising reacting an acyl halide with tetrahydrofuroic acid in the presence of a metallic halide, and hydrolyzing with a mineral acid.

7. A process for preparing a 4-halo-1-hydroxy-valeric acid comprising reacting an acyl halide with a tetrahydrofuroic acid alkyl ester in the presence of a metallic halide, and hydrolyzing with a mineral acid.

8. A valeric acid having the general formula:

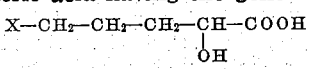

wherein X represents halogen.

9. A process for preparing a 4-halo-1-acyloxy-valeric compound comprising reacting an acyl halide with a compound selected from the group consisting of tetrahydrofuroic acid and tetrahydrofuroic acid alkyl esters, in the presence of a metallic halide catalyst.

JOSEPH B. DICKEY.
ROBERT A. CORBITT.